(12) United States Patent
McLaughlin et al.

(10) Patent No.: US 9,118,069 B2
(45) Date of Patent: Aug. 25, 2015

(54) BATTERY CELL WITH INTEGRATED BUSBAR

(75) Inventors: Barton W. McLaughlin, Troy, MI (US); Robert J. Heydel, Clawson, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 422 days.

(21) Appl. No.: 13/104,426

(22) Filed: May 10, 2011

(65) Prior Publication Data

US 2012/0288743 A1 Nov. 15, 2012

(51) Int. Cl.
| | |
|---|---|
| *H01M 2/24* | (2006.01) |
| *H01M 2/20* | (2006.01) |
| *H01M 2/30* | (2006.01) |
| *H01M 10/0525* | (2010.01) |

(52) U.S. Cl.
CPC .............. *H01M 2/206* (2013.01); *H01M 2/305* (2013.01); *H01M 2/20* (2013.01); *H01M 2/202* (2013.01); *H01M 10/0525* (2013.01); *H01M 2220/20* (2013.01); *Y02T 10/7011* (2013.01)

(58) Field of Classification Search
None
See application file for complete search history.

(56) References Cited

U.S. PATENT DOCUMENTS

| | | | | |
|---|---|---|---|---|
| 4,790,780 A | * | 12/1988 | Bushfield | 439/887 |
| 5,736,268 A | * | 4/1998 | Pondo | 429/452 |
| 6,773,301 B1 | * | 8/2004 | Chaskin | 439/500 |
| 2004/0048149 A1 | * | 3/2004 | Gross et al. | 429/127 |
| 2008/0131764 A1 | * | 6/2008 | Saiki | 429/149 |
| 2009/0208836 A1 | | 8/2009 | Fuhr et al. | |
| 2011/0052970 A1 | * | 3/2011 | Kurata et al. | 429/158 |
| 2011/0081568 A1 | * | 4/2011 | Kim et al. | 429/158 |

FOREIGN PATENT DOCUMENTS

| | | |
|---|---|---|
| CN | 1860662 A | 11/2006 |
| CN | 102034952 A | 4/2011 |
| JP | 2008181765 A | 8/2008 |
| JP | 2008181822 A | 8/2008 |

OTHER PUBLICATIONS

JP, 11-167912 (a raw machine translation) (Toyotaka et al.) (Jun. 22, 1999).*
Wataru (JP, 2008-181822) (a raw machine translation) (Abstract, Detailed Description and Drawings) (Aug. 7, 2008).*
Wataru et al. (JP, 2008-181765) (a raw machine translation) (Abstract, Detailed Description and Drawings) (Aug. 7, 2008).*

* cited by examiner

*Primary Examiner* — Milton I Cano
*Assistant Examiner* — Carmen Lyles-Irving
(74) *Attorney, Agent, or Firm* — Fraser Clemens Martin & Miller LLC; James D. Miller

(57) ABSTRACT

A battery cell has a main body including active material configured to generate power from an electrochemical reaction. A first terminal is disposed on the main body and includes an integrated busbar. The integrated busbar is configured to place the battery cell in electrical communication with a second terminal of an adjacent battery cell.

15 Claims, 4 Drawing Sheets

BATTERY CELL WITH INTEGRATED BUSBAR

FIELD OF THE INVENTION

The present disclosure relates to a battery pack and more particularly to an integrated busbar for the battery pack.

BACKGROUND OF THE INVENTION

A battery cell has been proposed as a clean, efficient and environmentally responsible power source for electric vehicles and various other applications. One type of battery cell is known as the lithium-ion battery. The lithium-ion battery is rechargeable and can be formed into a wide variety of shapes and sizes so as to efficiently fill available space in electric vehicles. For example, the battery cell may be in the form of a prismatic can.

A plurality of the battery cells can be provided in a battery pack to provide an amount of power sufficient to operate electric vehicles. Typically, the plurality of battery cells is interconnected with a separate elongate busbar. The separate busbar oftentimes has a plurality of holes that receive studs from the battery cells. Oftentimes, the studs are both threaded and connected to the busbar with nuts, or are welded directly to the busbar. The many different electrical interfaces along the busbar can result in power losses due to electrical resistance at the individual connections. The large number of electrical interfaces along the busbar also increases a likelihood of undesirable battery pack performance, and contributes to a manufacturing complexity of the known battery pack.

There is a continuing need for a battery pack assembly that permits an electrical connection of battery cells with a minimal number of components, minimizes mass, and which minimizes an electrical resistance within the battery pack assembly. Desirably, the battery pack assembly minimizes a potential for undesirable performance, and manufacturing complexity of the battery pack assembly.

SUMMARY OF THE INVENTION

In concordance with the instant disclosure, a battery pack assembly that permits an electrical connection of battery cells with a minimal number of components, minimizes an electrical resistance within the battery pack assembly, minimizes mass of the battery pack assembly, minimizes a potential for undesirable performance, and minimizes manufacturing complexity of the battery pack assembly, is surprisingly discovered.

In a first embodiment, a battery cell includes a main body having an active material configured to generate power from an electrochemical reaction. The battery cell further includes a first terminal with an integrated busbar. The integrated busbar is configured to place the battery cell in electrical communication with a second terminal of an adjacent battery cell.

In another embodiment, a battery cell assembly includes a first battery cell having a main body with an active material configured to generate power from an electrochemical reaction, and a first terminal with an integrated busbar. The battery cell assembly also includes a second battery cell disposed adjacent the first battery cell. The second battery cell has a main body including active material configured to generate power from an electrochemical reaction. The second battery cell also has a second terminal in electrical communication with the integrated busbar of the first battery cell.

In a further embodiment, a battery cell assembly includes a first battery cell having a main body with an active material configured to generate power from an electrochemical reaction, and a first terminal with an integrated busbar. The integrated busbar is substantially L-shaped and includes a first portion extending outwardly from the main body. The integrated busbar also includes a second portion connected to the first portion. The second portion extends laterally from the first portion. The battery cell assembly also includes a second battery cell disposed adjacent the first battery cell. The second battery cell has a main body including active material configured to generate power from an electrochemical reaction. The second battery cell also has a second terminal in electrical communication with the second portion of the integrated busbar of the first battery cell.

DRAWINGS

The above, as well as other advantages of the present disclosure, will become readily apparent to those skilled in the art from the following detailed description, particularly when considered in the light of the drawings described herein.

DETAILED DESCRIPTION OF THE INVENTION

The following detailed description and appended drawings describe and illustrate various embodiments of the invention. The description and drawings serve to enable one skilled in the art to make and use the invention, and are not intended to limit the scope of the invention in any manner.

Figure 1:
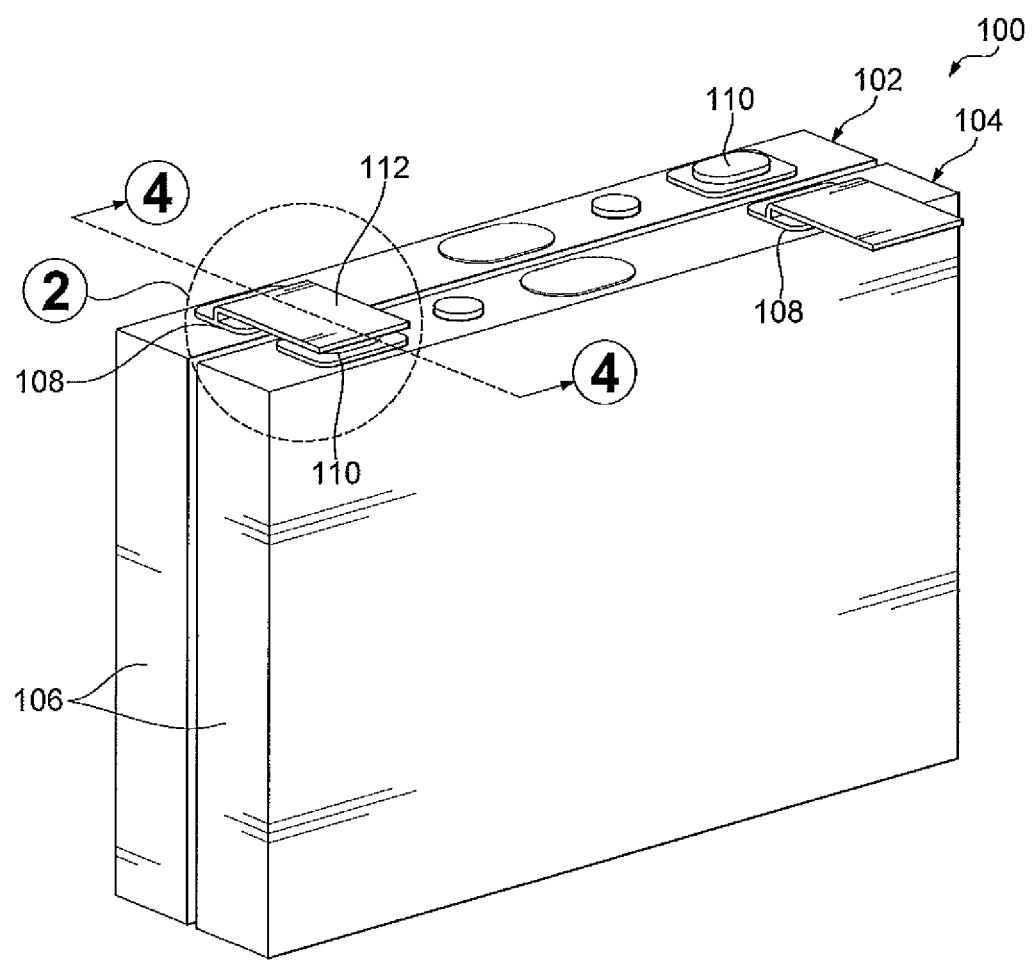
FIG. 1 is a perspective view of a battery pack according to one embodiment of the present disclosure, with two battery cells shown in electrical communication.
Figure 2:
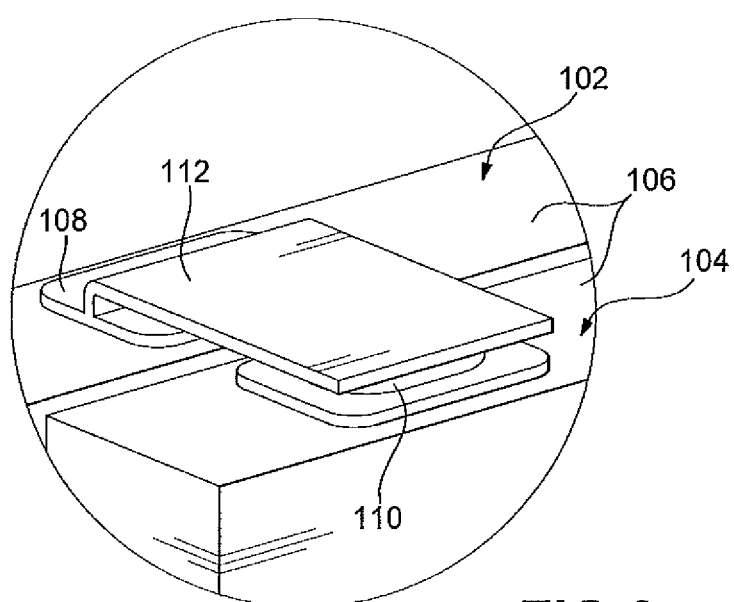
FIG. 2 is an enlarged fragmentary perspective view of the battery pack shown in circle 2 of FIG. 1, further illustrating an integrated busbar tab of one of the battery cells.

With reference to FIGS. 1-2, a battery cell assembly 100 according to one embodiment of the present disclosure is shown. The battery cell assembly 100 includes a plurality of battery cells 102, 104. The battery cells 102, 104 shown are prismatic can battery cells. As a nonlimiting example, the battery cells 102, 104 may be a prismatic can lithium ion (Li-ion) battery cell. It should be appreciated that other can-type battery cells 102, 104, employing a different structure such as cylindrical and a different electrochemistry, may also be used within the scope of the present invention. Although only two battery cells 102, 104 are shown in FIG. 1, it should be understood that additional like battery cells 102, 104 may be disposed in an array to form the battery pack assembly 100 of the present disclosure.

The battery cell assembly 100 of the present disclosure includes a first battery cell 102 and a second battery cell 104. The first battery cell 102 is disposed adjacent the second battery cell 104, for example, in an array of the battery cells 102, 104. Each of the first battery cell 102 and the second battery cell 104 has a main body 106 with an active material configured to generate power from an electrochemical reaction. The first battery cell 102 and the second battery cell 104 each also include a first terminal 108 and a second terminal 110. The first terminal 108 may be positive and the second terminal 110 may be negative, or vice-versa, as desired.

Where the first terminal 108 is used in a can-positive battery system, for example, as illustrated in FIGS. 1-4E, the first terminal 108 may be in electrical communication with the main body 106. However, a skilled artisan should understand that the present invention is also applicable to a can-neutral battery system, with the first terminal 108 being electrically insulated from the main body 106, for example, with a polymeric spacer or the like. One of ordinary skill in the art should therefore appreciate that the present invention can be employment independent of whether the battery system is can-positive or can-neutral, as desired.

The first terminal 108 has an integrated busbar 112. The integrated busbar 112 is configured to place the first terminal 108 of the first battery cell 102 in electrical communication with the second terminal 110 of the adjacent second battery cell 104. In particular, the integrated busbar 112 of the first terminal 108 of the first battery cell 102 is connected to the second terminal 110 of the second battery cell 104. The integrated busbar 112 may be welded to the second terminal 110, for example, by laser welding or the like.

Figure 3:
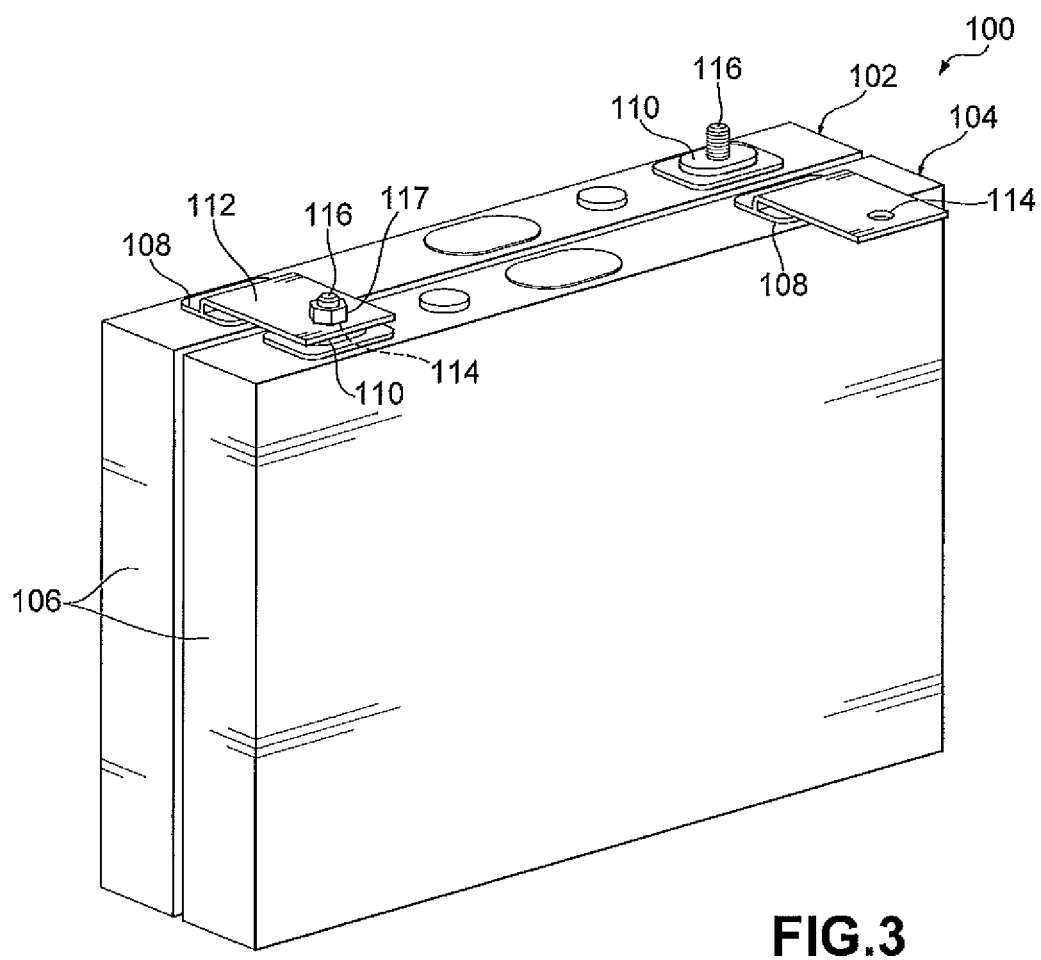
FIG. 3 is a perspective view of a battery pack according to another embodiment of the present disclosure, with two battery cells shown in electrical communication.

In a certain embodiment illustrated in FIG. 3, the integrated busbar 112 has an aperture 114 formed therein, and the second terminal 110 includes an electrical post 116 that is received in the aperture 114 of the integrated busbar 112. The electrical post 116 may be threaded and permit a mechanical fastening of the integrated busbar 112 to the second terminal 110 with a threaded nut 117. Other means for affixing the integrated busbar 112 of the first terminal 108 of the first battery cell 102 to the second terminal 110 of the second battery cell 104 may also be employed within the scope of the present disclosure.

Referring now to FIGS. 4A-4E, the integrated busbar 112 of the present disclosure includes a first portion 118 and a second portion 120. The first portion 118 extends laterally outwardly from the main body 106. The second portion 120 is coupled with the first portion 118 and extends laterally from the first portion 118. In particular embodiments, the first portion 118 and the second portion 120 are integral. The second portion 120 overhangs the main body 106 and contacts the second terminal 110 to place the first battery cell 102 in electrical communication with the second battery cell 104. In a particular embodiment, the integrated busbar 112 is substantially L-shaped in cross section. Where the integrated busbar 112 has the first portion 118 and the second portion 120, and the integrated busbar 112 includes the aperture 114 for receiving the electrical post 116 as shown in FIG. 3, the aperture 114 may be formed in the second portion of the integrated busbar 112.

Figure 4A:
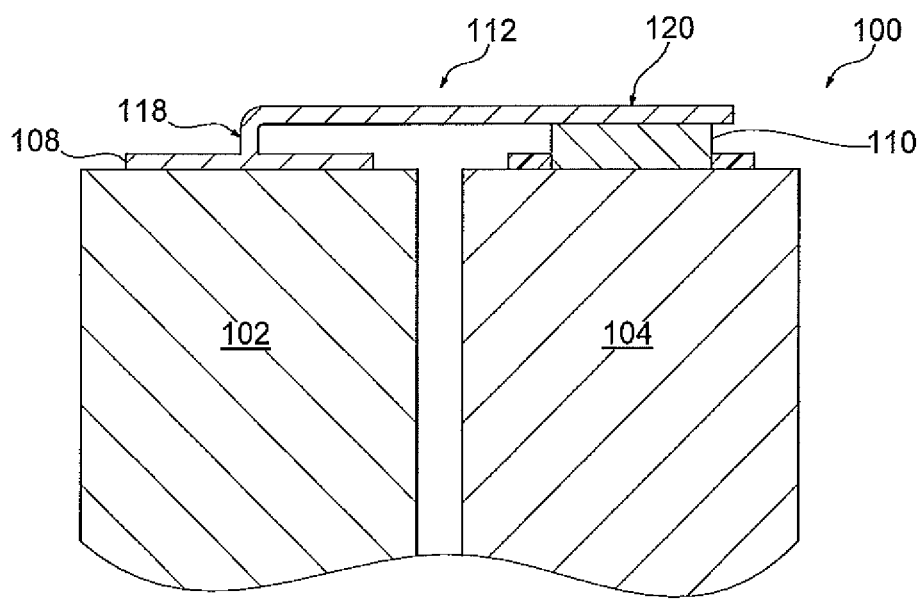
FIGS. 4A-4E are enlarged fragmentary cross-sectional views of the battery pack taken at section line 4 in FIG. 1, further illustrating various embodiments of the integrated busbar of the one of the battery cells.
Figure 4B:
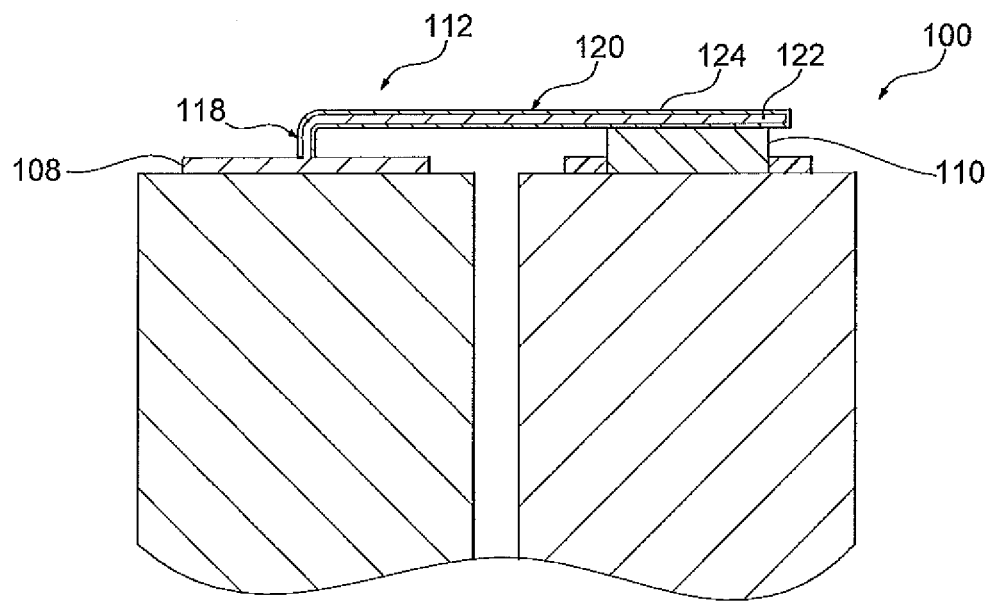

Embodiments where the integrated busbar 112 is rigid are shown in FIGS. 4A-4B. Where the integrated busbar 112 is rigid, it should be appreciated that the first battery cell 102 and the adjacent second battery cell 104 will have to be manufactured as different units and alternated throughout the battery pack 100 to ensure connection of the first and second battery cells 102, 104 in series. As a nonlimiting example, the rigid integrated busbar 112 may be formed of a unitary electrically conductive material as shown in FIG. 4A. The rigid, unitary integrated busbar may be formed from one of aluminum and copper, as particular nonlimiting examples. A skilled artisan may select other suitably rigid electrically conductive materials, as desired.

With reference to FIG. 4B, the integrated busbar 112 is rigid and includes a first electrically conductive material 122 and a second electrically conductive material 124. The second electrically conductive material 124 is coated on the first electrically conductive material 122. As a nonlimiting example, the first electrically conductive material 122 is copper and the second electrically conductive material 124 is one of nickel, zinc, and tin. Where the integrated busbar 112 is coated, the integrated busbar 112 may be particularly suitable for resistance welding or mechanical fastening, for example, as illustrated in FIG. 3. The coating of the second electrically conductive material 124 is typically a metal that is more neutral than a metal of the first electrically conductive material 122. The coating of the second electrically conductive material 124 may be provided to reduce galvanic corrosion. It should be understood that other electrically conductive materials may be used for the first electrically conductive material 122 and the second electrically conductive material 124 within the scope of the present disclosure.

Figure 4C:
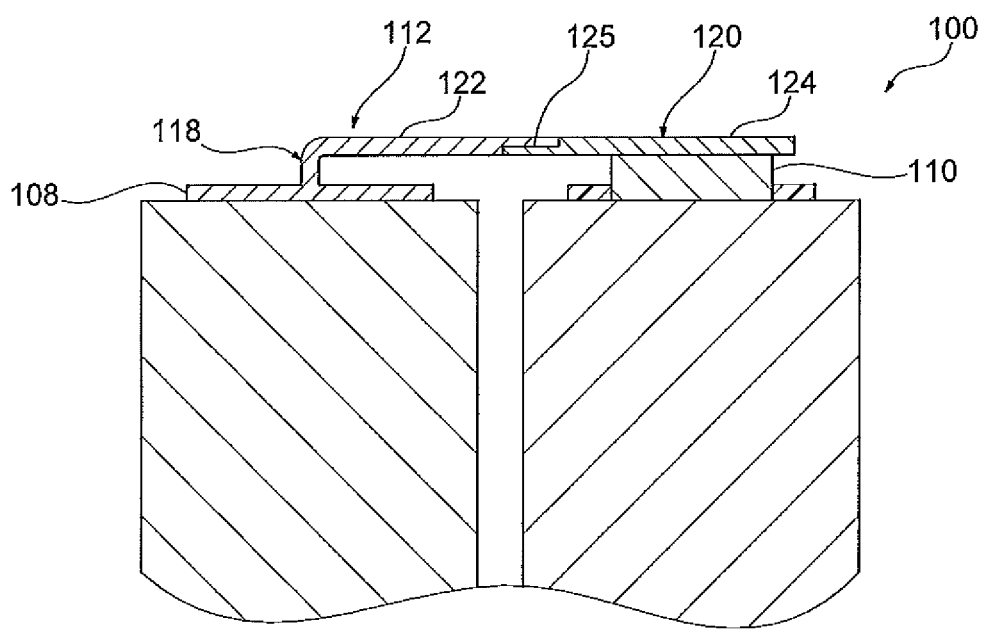

Referring to FIG. 4C, the integrated busbar is rigid and includes the first electrically conductive material 122 clad with the second electrically conductive material 124. The cladding process incorporates a defined interface 125 where the first electrically conductive material 122 and the second electrically conductive material 124 are pressed together. The second electrically conductive material 124 will typically be selected to be welding-compatible with the material of the second terminal 110. For example, the same or like materials may be employed for both the second electrically conductive material 124 and the material of the second terminal 110 where welding such as laser welding is desired. As a nonlimiting example, the first electrically conductive material 122 may be formed from aluminum and the second electrically conductive material 124 may be formed from copper. The employment of copper clad aluminum for the integrated busbar 112 may permit a desirable welding operation to connect the integrated busbar 112 to the second terminal 110, for example, where the second terminal 110 is also formed from copper. It should be understood that other electrically conductive materials may be used for the first electrically conductive material 122 and the second electrically conductive material 124 within the scope of the present disclosure.

Figure 4D:
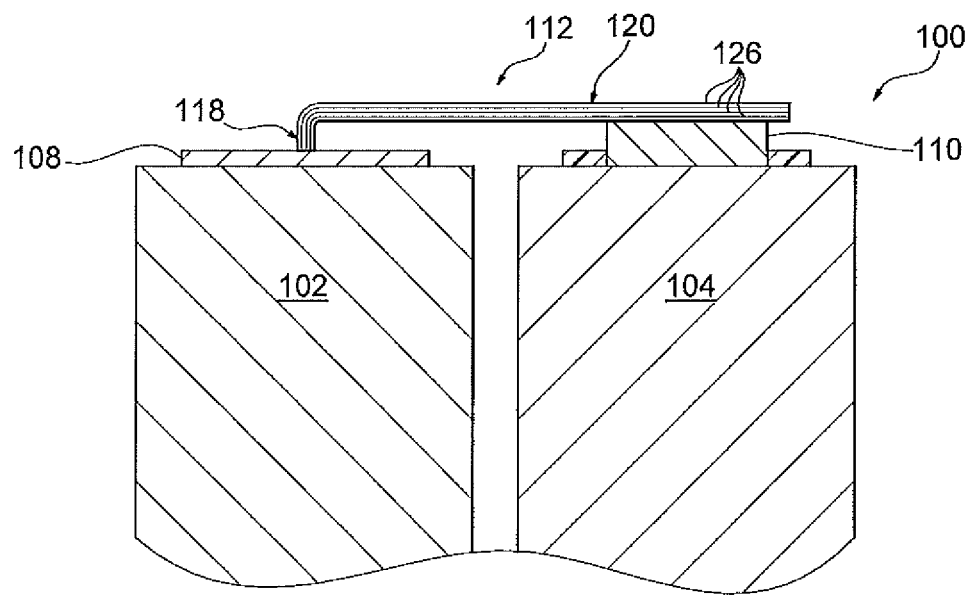
Figure 4E:
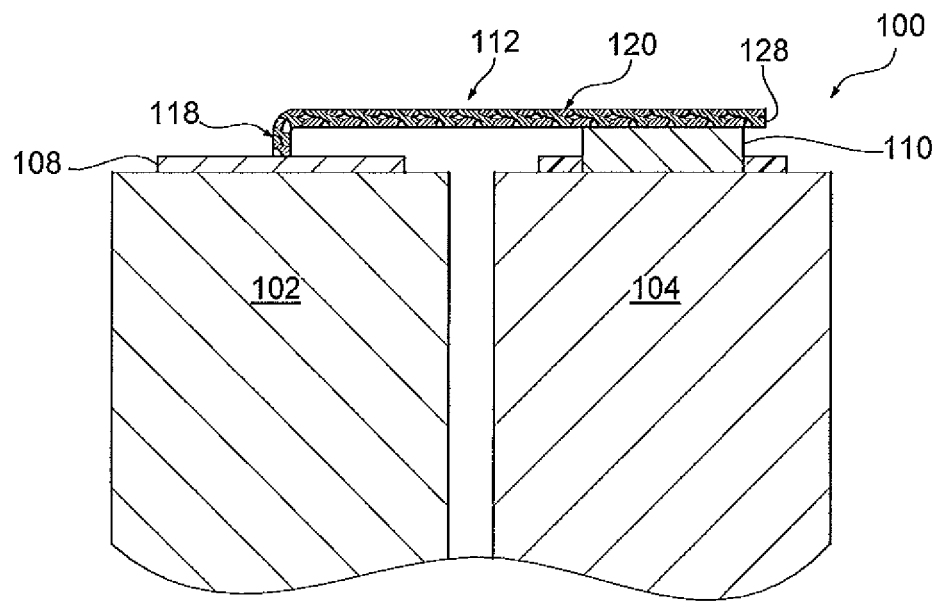

Embodiments where the integrated busbar 112 is flexible are shown in FIG. 4D-4E. Where the integrated busbar 112 is flexible, it should be appreciated that the first battery cell 102 and the adjacent second battery cell 104 can be manufactured the same, and the integrated busbar 112 flexed or bent in a desired direction when the first battery cell 102 and the second battery cell 104 are disposed in an array within the battery pack 100. For example, the first battery cell 102 may have the integrated busbar 112 flexed or bent in a first direction, and the second battery cell 104 may have the integrated busbar 112 flexed or bent in a second direction different from the first direction, with subsequent battery cells 102, 104 alternating in the battery pack 100 in a like manner to assemble the battery pack 100. The flexible integrated busbar 112 thereby advantageously facilitates minimal manufacturing complexity for the battery pack 100 of the present disclosure.

As shown in FIG. 4D, the integrated busbar 112 is flexible and may include a laminate formed from a plurality of electrically conductive layers 126. As a nonlimiting example, the electrically conductive layers 126 may include a plurality of thin copper sheets. Each of the electrically conductive layers 126 has a thickness that facilitates a bending of the laminate formed from the electrically conductive layers 126. As a nonlimiting example, the thickness of each of the electrically conductive layers 126 may be between about 5 mil and about 20 mil. The lamination of the thin electrically conductive layers 112 facilitates a flexibility and a bending of the integrated busbar 112 during assembly of the battery pack 100. A skilled artisan may select types of the electrically conductive layers 126, and an appropriate thickness of the electrically conductive layers, as desired.

With reference to FIG. 4E, the integrated busbar 112 is flexible and may include a braided electrically conductive material 128. As a nonlimiting example, braided electrically conductive material 128 may be braided copper. Other types of electrically conductive cloths or weaves, including other types of electrically conductive materials, may also be used as the braded electrically conductive material 128 within the scope of the present disclosure.

Advantageously, the integrated busbar 112 of the present disclosure facilitates assembly of the battery pack 100 with fewer components. One source of electrically resistance, and potentially undesirable performance, in prior art battery packs is also eliminated through use of the integrated busbars 112 of the first and second battery cells 102, 104, since the integrated busbars 112 are not separately connected to both the first battery cell 102 and the second battery cell 104. A durability of the battery pack 100 is also optimized by minimizing the number of electrical interfaces within the battery pack 100 through use of the integrated busbars 112.

While certain representative embodiments and details have been shown for purposes of illustrating the invention, it will be apparent to those skilled in the art that various changes may be made without departing from the scope of the disclosure, which is further described in the following appended claims.

What is claimed is:

1. A battery cell assembly comprising:
   a first battery cell including a first terminal, a second terminal, and a main body with an active material configured to generate power from an electrochemical reaction; and
   a second battery cell including a first terminal, a second terminal extending in a single direction from the second battery cell, and a main body with an active material configured to generate power from an electrochemical reaction, the first battery cell disposed adjacent the second battery cell;
   wherein the first terminal of the first battery cell includes an integrated busbar, the integrated busbar comprising:
      a first planar portion extending from the first terminal of the first battery cell in a first direction; and
      a second planar portion extending towards the second terminal of the second battery cell in a second direction, the second direction different from the first direction, the second planar portion contacting the second terminal of the second battery cell on a face of the second planar portion;
   wherein at least a part of the first terminal of the first battery cell, at least a part of the first planar portion, and at least a part of the second planar portion are formed of a single and continuous piece of material.

2. The battery cell assembly of claim 1, wherein the integrated busbar is formed from one of aluminum and copper.

3. The battery cell of claim 1, wherein the at least a part of the first terminal of the first battery cell, the at least a part of the first planar portion, and the at least a part of the second planar portion are formed from a single and continuous piece of a first electrically conductive material, and the first electrically conductive material forming the at least a part of the first planar portion and the second planar portion is coated with a second electrically conductive material different from the first electrically conductive material.

4. The battery cell assembly of claim 1, wherein the integrated busbar is rigid and at least a part of the second planar portion is formed of a first electrically conductive material clad with a second electrically conductive material different from the first electrically conductive material, wherein the second electrically conductive material is clad to a distal end of the second planar portion in contact with the second terminal of the second battery cell.

5. The battery cell assembly of claim 1, wherein the integrated busbar of the first terminal of the first battery cell is welded to the second terminal of the second battery cell.

6. The battery cell assembly of claim 1, wherein the integrated busbar has an aperture formed in the second portion, the second terminal of the second battery cell includes an electrical post, and the electrical post is received in the aperture.

7. The battery cell assembly of claim 6, wherein the electrical post is threaded and affixed to the integrated busbar with a nut.

8. The battery cell assembly of claim 1, wherein the first battery cell and second battery cell each comprise a prismatic can lithium ion battery cell.

9. The battery cell assembly of claim 1, wherein the first battery cell and second battery cell are disposed in an array of battery cells.

10. The battery cell assembly of claim 1, wherein the first terminal of the first battery cell is in electrical communication with the main body of the first battery cell.

11. The battery cell assembly of claim 1, wherein the first terminal of the first battery cell is electrically insulated from the main body of the first battery cell.

12. The battery cell assembly of claim 1, wherein a transition from the first planar portion to the second planar portion includes one of a flex or a bend formed in the single and continuous piece of material.

13. The battery cell assembly of claim 1, wherein the first battery cell is planar and the first planar portion extending from the main body of the first battery cell in the first direction is parallel with the first battery cell.

14. The battery cell assembly of claim 13, wherein the second direction is perpendicular to the first direction.

15. The battery cell assembly of claim 1, wherein the first planar portion is smaller than the second planar portion.

* * * * *